(12) United States Patent
Shin et al.

(10) Patent No.: US 10,848,653 B2
(45) Date of Patent: Nov. 24, 2020

(54) DOME CAMERA DEVICE

(71) Applicant: HANWHA TECHWIN CO., LTD., Seongnam-si (KR)

(72) Inventors: Hyun Soo Shin, Changwon-si (KR); Nam Il Kim, Changwon-si (KR); Eun Soo Choi, Changwon-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 0 days.

(21) Appl. No.: 16/209,233

(22) Filed: Dec. 4, 2018

(65) Prior Publication Data

US 2019/0116299 A1   Apr. 18, 2019

Related U.S. Application Data

(63) Continuation of application No. 15/503,969, filed as application No. PCT/KR2015/001529 on Feb. 16, 2015, now Pat. No. 10,178,283.

(30) Foreign Application Priority Data

Aug. 14, 2014 (KR) .................. 10-2014-0106036

(51) Int. Cl.
*H04N 5/225* (2006.01)
*H04N 7/18* (2006.01)

(52) U.S. Cl.
CPC ............. *H04N 5/2252* (2013.01); *H04N 7/18* (2013.01); *H04N 7/183* (2013.01)

(58) Field of Classification Search
CPC ......... H04N 5/2252; H04N 7/18; H04N 7/183
See application file for complete search history.

(56) References Cited

U.S. PATENT DOCUMENTS

| 8,764,318 B2* | 7/2014 | Wada ............... G03B 17/56 396/427 |
| 2004/0100563 A1* | 5/2004 | Sablak ............ H04N 5/23212 348/211.4 |
| 2006/0017842 A1* | 1/2006 | Jun ................. H04N 5/2251 348/373 |
| 2008/0008467 A1* | 1/2008 | Liu ................ G03B 17/02 396/427 |
| 2010/0128122 A1* | 5/2010 | Wright .......... G03B 17/561 348/143 |

(Continued)

FOREIGN PATENT DOCUMENTS

| KR | 1020040068810 A | 8/2004 |
| KR | 1020090022694 A | 3/2009 |
| KR | 1020090084170 A | 8/2009 |

OTHER PUBLICATIONS

Korean Office Action dated Jun. 20, 2019; Appln. No. 10-2014-0106036.

*Primary Examiner* — Amy R Hsu
(74) *Attorney, Agent, or Firm* — McLean IP Global; Jason Y. Pahng (57) ABSTRACT

A dome camera device is provided, including: a housing part which accommodates a camera for photographing a subject; a connection cover part which covers at least part of a circumference of the housing part; a first rotation restricting part which limits a rotation range of the housing part in a first rotation direction; and a second rotation restricting part which limits the rotation range of the housing part in a second rotation direction.

9 Claims, 8 Drawing Sheets

(56) References Cited

U.S. PATENT DOCUMENTS

| | | | |
|---|---|---|---|
| 2012/0182472 A1* | 7/2012 | Inata | G03B 5/00 |
| | | | 348/374 |
| 2013/0287385 A1* | 10/2013 | Andersson | H04N 5/2252 |
| | | | 396/427 |
| 2013/0321697 A1* | 12/2013 | Kang | H04N 5/2254 |
| | | | 348/373 |
| 2014/0028844 A1* | 1/2014 | Osawa | H04N 7/183 |
| | | | 348/143 |
| 2014/0354836 A1* | 12/2014 | Takizawa | G03B 5/00 |
| | | | 348/208.11 |

* cited by examiner

DOME CAMERA DEVICE

TECHNICAL FIELD

The present inventive concept relates to a dome camera device, and more particularly, to a dome camera device which limits the rotation range of a housing part in which a camera is accommodated.

BACKGROUND ART

In general, surveillance cameras are installed inside and outside offices and hospitals as well as banks and public buildings that require security and are widely used for access control and crime prevention. These days, many surveillance cameras are being installed in parking lots or roads where crimes occur frequently or in residential areas where various accidents occur frequently.

Various forms of surveillance cameras, such as linear cameras and dome cameras, are used depending on the installation site and purpose of use. Of these cameras, a dome camera with a clear dome that wraps a camera to prevent the camera lens from being exposed is generally installed.

In the clear dome, a camera for photographing a subject is accommodated. The camera is connected to an external device by cables and transmits photographed image information to the external device through the cables. The clear dome rotates in a pan direction (horizontal direction), a tilt direction (vertical direction), and a rotate direction (left and right direction), thereby enlarging the photographing range of the camera. That is, the clear dome can rotate infinitely in three directions of pan, tilt and rotate.

However, as the clear dome of the dome camera device rotates infinitely in three directions, the cables connected to the camera can get twisted.

DISCLOSURE

Technical Problem

Aspects of the inventive concept provide a dome camera device which limits the rotation range of a housing part in which a camera is accommodated.

However, aspects of the inventive concept are not restricted to the one set forth herein. The above and other aspects of the inventive concept will become more apparent to one of ordinary skill in the art to which the inventive concept pertains by referencing the detailed description of the inventive concept given below.

Technical Solution

According to an aspect of the inventive concept, there is provided a housing part which accommodates a camera for photographing a subject; a connection cover part which covers at least part of a circumference of the housing part; a first rotation restricting part which limits a rotation range of the housing part in a first rotation direction; and a second rotation restricting part which limits the rotation range of the housing part in a second rotation direction.

Advantageous Effects

A dome camera device according to the inventive concept provides at least one of the following advantages.

It is possible to prevent a cable connected to a dome camera device from being twisted by limiting the rotation range of the dome camera device in a rotate direction (first rotation direction) and a tilt direction (second rotation direction).

However, the effects of the inventive concept are not restricted to the one set forth herein. The above and other effects of the inventive concept will become more apparent to one of daily skill in the art to which the inventive concept pertains by referencing the claims.

DESCRIPTION OF DRAWINGS

These and/or other aspects will become apparent and more readily appreciated from the following description of the embodiments, taken in conjunction with the accompanying drawings in which.

MODE FOR INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
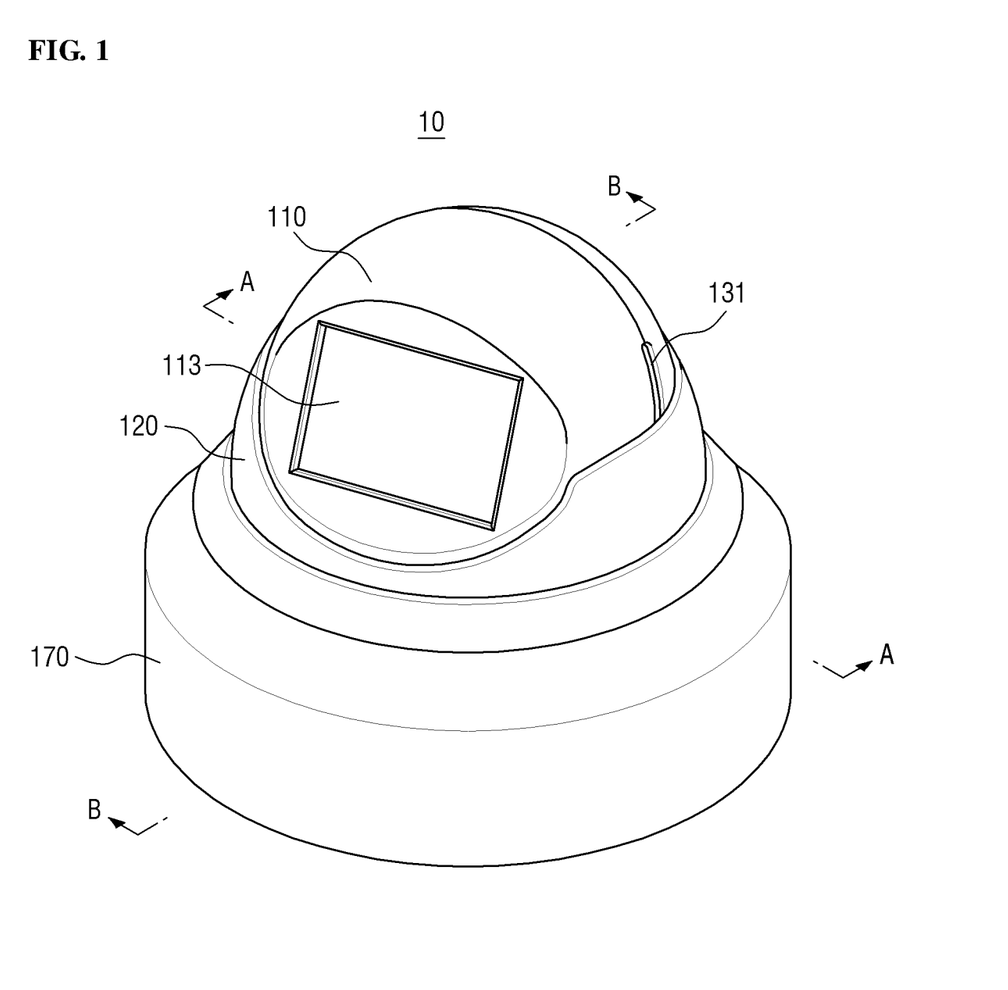
FIG. 1 is a perspective view of a dome camera device according to an embodiment of the inventive concept.
Figure 2:
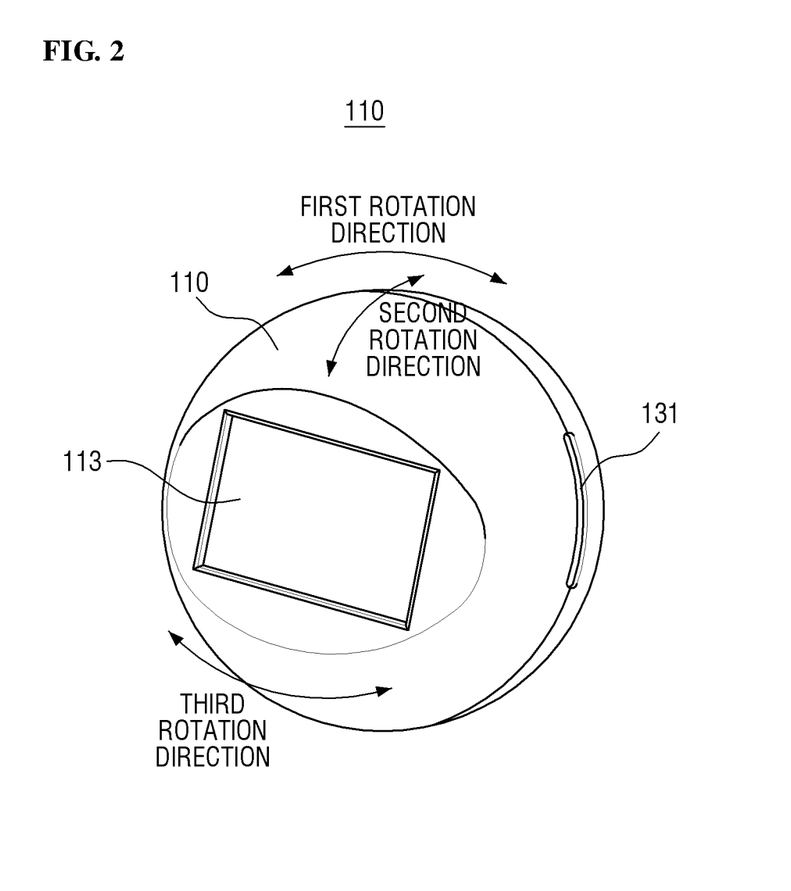
FIG. 2 is a perspective view of a housing part of the dome camera device according to the embodiment of the inventive concept.

FIG. 1 is a perspective view of a dome camera device according to an embodiment of the inventive concept. FIG. 2 is a perspective view of a housing part of the dome camera device according to the embodiment of the inventive concept.

Referring to FIGS. 1 and 2, the dome camera device 10 according to the embodiment of the inventive concept includes the housing part 110 and a connection cover part 120. In addition, the dome camera device may further include a base cover part 170.

The housing part 110 is a component for accommodating a camera (not illustrated) that photographs a subject. That is, the housing part 110 is a component for protecting the camera from external dust, moisture, and the like. In an example, the camera may be received and fixed to a certain extent in a receiving space formed in the housing part 110.

The housing part 110 may have a transparent window 113 at a position corresponding to a lens of the camera. Accordingly, the camera housed in the housing part 110 can take a picture of a subject through the transparent window 113.

The housing part 110 may have a spherical shape. However, a portion where the transparent window 113 is formed may be formed to correspond to the shape of the transparent window. For example, when the transparent window 113 is formed flat, the portion of the housing part 110 where the transparent window is formed may be formed flat.

In addition, the housing part 110 includes the transparent window on the front side, and a cable connected to the camera housed inside the housing part is connected to the rear side. In addition, at least part of the circumference of the housing part 110 is covered by the connection cover part 120.

The connection cover part 120 is connected to the housing part 110 by covering at least part of the circumference of the housing part 110. For example, the connection cover part 12 may be formed in a cylindrical shape so as to cover the circumference of the housing part 110.

The base cover part 170 partially covers a base frame part 160 (see FIG. 3), a rotation driving part 150 (see FIG. 3) and the connection cover part 120 to be described later and protects them from external impacts and foreign substances.

Figure 3:
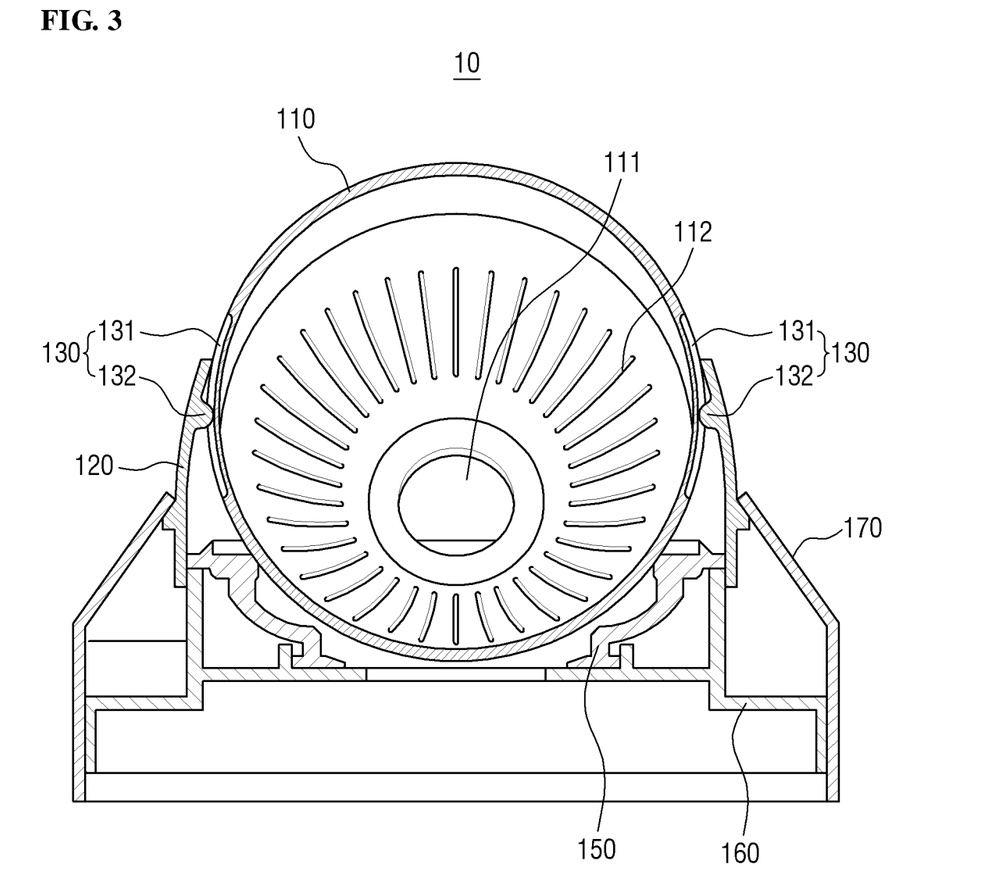
FIG. 3 is a cross-sectional view taken along the line A-A of FIG. 1.
Figure 4:
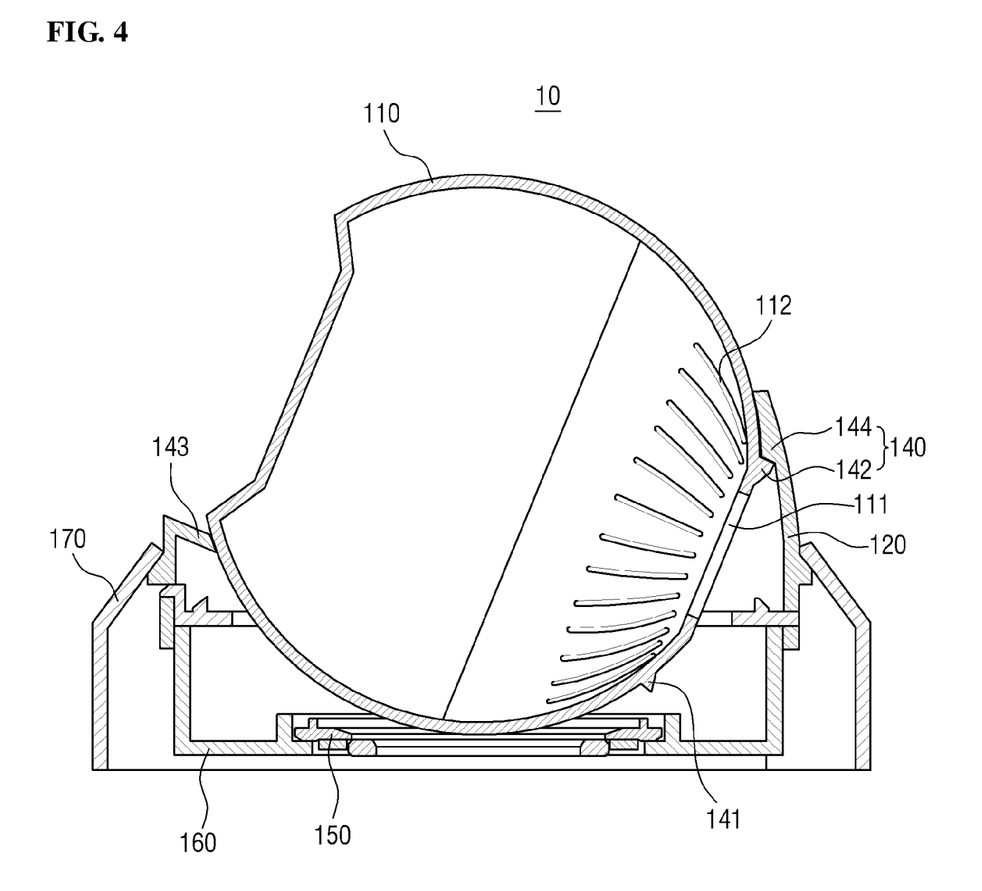
FIG. 4 is a cross-sectional view taken along the line B-B of FIG. 1.

FIG. 3 is a cross-sectional view taken along the line A-A of FIG. 1. FIG. 4 is a cross-sectional view taken along the line B-B of FIG. 1.

Referring to FIGS. 3 and 4, the dome camera device 10 according to the embodiment of the inventive concept includes the housing part 110, the connection cover part 120, a first rotation restricting part 130, and a second rotation restricting part 140. The dome camera device 10 may further include the rotation driving part 150, the base cover part 170, and the base frame 160.

A redundant description of components identical to those of FIGS. 1 and 2 will be omitted.

The housing part 110 is connected to and supported by the rotation driving part 150. In addition, the housing part 110 may be rotated in at least one of a first rotation direction, a second rotation direction and a third rotation direction by the rotation driving part 150.

Here, the first rotation direction is a rotate direction, the second rotation direction is a tilt direction, and the third rotation direction is a pan direction. For example, the first rotation direction may be a left-right rotation direction of the housing part 110, the second rotation direction may be a vertical rotation direction of the housing part 110, and the third rotation direction may be a horizontal rotation direction of the housing part 110.

The housing part 110 has a cable connection hole 111, through which a cable (not illustrated) passes, in an area adjacent to a cable connection terminal (not illustrated) of the camera (not illustrated). For example, the housing part 110 may have the cable connection hole 111, through which the cable passes, in a rear surface. In addition, the cable connection hole 111 may be, but is not limited to, circular.

The housing part 110 has heat dissipation holes 112 for dissipating heat generated when the camera photographs a subject. For example, the heat dissipation holes 112 for dissipating internal heat to the outside may be formed in the rear surface of the housing part 110 in an area adjacent to the cable connection hole 111. In addition, a cooling fan (not illustrated) may be provided inside the housing part 110, and the heat inside the housing part 110 can be rapidly discharged to the outside through the heat dissipation holes 112 by the operation of the cooling fan.

The connection cover part 120 covers at least part of the circumference of the housing part 110 and is supported by the base frame part 160. The connection cover part 120 is connected to the rotation driving part 150 to rotate in the third rotation direction (the pan direction) at the same time as the housing part 110.

A portion of the circumference of the connection cover part 120 is inserted into the base cover part 170. A movable protrusion (not illustrated) is formed to protrude along the circumference of the connecting cover part 120. The movable protrusion of the connection cover part 120 is inserted into a movable groove (not illustrated) formed in the base cover part 170. Accordingly, the rotation range of the connection cover part 120 in the third rotation direction may be limited. Specifically, when the connection cover part 120 is rotated in the third rotation direction by the rotation driving part 150, the movable protrusion (not illustrated) moves in the third rotation direction along the movable groove (not illustrated). In addition, when the movable protrusion is located at an end of the movable groove, it cannot move further in the third rotating direction. Accordingly, the connection cover part 120 can no longer rotate in the third rotating direction.

The first rotation restricting part 130 limits the rotation range of the housing part 110 in the first rotation direction (the rotate direction). The first rotation restricting part 130 includes a guide slot 131 and a guide protrusion 132 inserted into the guide slot 131 to be slidably moved.

The guide slot 131 is recessed on both sides of the housing part 110. Here, both sides denote left and right sides. Specifically, the guide slot 131 may be formed on both sides of the housing part 110 to extend along the first rotation direction and may be recessed to a predetermined depth. Accordingly, the guide protrusion 132 can be inserted into the guide slot 131 to slide along the guide slot 131 in the first rotation direction or to relatively rotate in place.

Here, when the guide protrusion 132 relatively rotates, it does not mean that the guide protrusion 132 rotates in the guide slot 131 by itself but that the guide protrusion 132 relatively rotates as compared with the housing part 110 when the housing part 110 rotates in the second rotation direction. That is, the guide protrusion 132 may be inserted into the guide slot 131 and serve as a rotation axis of the second rotation direction.

The first rotation restricting part 130 may include a step portion (not illustrated) for restricting the sliding movement of the guide protrusion 132 at both ends of the guide slot 131. The step portion may be located at both ends of the guide slot 131 and extend outward. Accordingly, when the housing part 110 rotates rapidly in the first rotation direction, the step portion can prevent the guide protrusion 132 from deviating from the guide slot 131.

The guide protrusion 132 is formed on the connection cover part 120 and is located at a position corresponding to the guide slot 131. For example, the guide protrusion 132 is located on both sides of the connection cover part 120. In addition, the guide protrusion 132 protrudes inwards to be inserted into the guide slot 131. Accordingly, the guide protrusion 132 limits the rotation of the housing part 110 in the first rotation direction to the length of the guide slot 131. That is, the guide protrusion 132 serves as a stopper. In addition, the guide protrusion 132 may protrude such that a tip end of the guide protrusion 132 is in point contact with the guide slot 131.

The guide protrusion 132 is formed on each of both sides of the connection cover part 120 such that a virtual line connecting the guide protrusions 132 passes through a virtual rotation axis of the housing part 110 in the first rotation direction. However, the inventive concept is not limited to this case.

Here, the guide protrusion 132 may be integrally formed with the connection cover part 120, and the guide slot 131 may also be integrally formed with the housing part 110.

The second rotation restricting part 140 limits the rotation range of the housing part 110 in the second rotation direction. The second rotation restricting part 140 includes stoppers 141 and 142 and stopping protrusions 143 and 144 on which the stoppers 141 and 142 are caught.

The stoppers 141 and 142 are formed on the rear surface of the housing part 110. The stoppers 141 and 142 may be formed in an area adjacent to the cable connection hole 111 described above and may protrude outward.

The stoppers 141 and 142 may include a first stopper 141 and a second stopper 142. The first stopper 141 limits the range of forward rotation of the housing part 110 in the second rotation direction. In addition, the second stopper 142 is spaced apart from the first stopper 141 and limits the range of reverse rotation of the housing part 110 in the second rotation direction.

For example, the stopper 141 may be formed under the cable connection hole 111 formed in the rear surface of the housing part, and the second stopper 142 may be formed above the cable connection hole 111. Here, the forward rotation denotes a clockwise direction, and the reverse rotation denotes a counterclockwise direction.

The stopping protrusions 143 and 144 protrude inward from the connection cover part 120. When the housing part 110 rotates in the second rotation direction, the stoppers 141 and 142 formed on the housing part 110 are caught on the stopping protrusions 143 and 144. Accordingly, the rotation range of the housing portion 110 in the second rotation direction can be limited.

The stopping protrusions 143 and 144 may include a first stopping protrusion 143 and a second stopping protrusion 144. The first stopping protrusion 143 is located at the front of the connecting cover part 120, and the first stopper 141 described above is caught on the first stopping protrusion 143. The second stopping protrusion 144 is located at the rear of the connection cover part 120, and the second stopper 142 described above is caught on the second stopping protrusion 144.

Here, the stoppers 141 and 142 may be integrally formed with the housing part 110, and the stopping protrusions 143 and 144 may be integrally formed with the connection cover part 120.

The rotation driving part 150 rotates the housing part 110 in at least one of the first rotation direction (the rotate direction) and the second rotation direction (the tilt direction). In addition, the rotation driving part 150 may rotate the housing part 110 and the connection cover part 120 simultaneously in the third rotation direction (the pan direction). Accordingly, the rotation driving part 150 can freely rotate the housing part 110 in any one of the first rotation direction, the second rotation direction and the third rotation direction, so that the camera housed in the housing part 110 can freely move together with the housing part 110 to photograph a subject at various angles.

The rotation driving part 150 may form a recessed portion (not illustrated) into which the housing part 110 is inserted, and a fixing protrusion (not illustrated) extending outwards may be formed on the circumference of the rotation driving part 150. The fixing protrusion is inserted into a fixing groove (not illustrated) formed in the connection cover part 120 so as to couple the rotation driving part 150 to the connection cover part 120. The rotation driving part 150 is positioned on the base frame part 160 and is supported by the base frame part 160.

The base frame part 160 is a component for supporting the housing part 110 and the connection cover part 120. In addition, the base frame part 160 may support the rotation driving part 150.

The base frame part 160 is closely attached to a wall or ceiling so as to fix the dome camera device 10 in a specific space. To this end, the base frame part 160 may include a coupling hole (not illustrated) through which a coupling member (not illustrated) penetrates. The coupling member such as a screw or a nail is inserted into a wall or a ceiling through the coupling hole, thereby closely fixing the base frame part 160 to the wall or the ceiling.

The base cover part 170 may partially cover the base frame part 160, the rotation driving part 150 and the connection cover part 120 and protect them from external impacts and foreign substances as described above.

The movable groove (not illustrated) may be formed in an inner surface of the base cover part 170. The movable protrusion (not illustrated) of the connection cover part 120 is inserted into the movable groove and slidably moved along the movable groove. The movable groove is located at a position corresponding to the movable protrusion of the connection cover part 120. For example, the movable groove may be formed on the inner surface of the base cover part 170 along the third rotation direction and limit the rotation range of the connection cover part 120 in the third rotation direction. Accordingly, the rotation range of the housing part 110 connected to the connection cover part 120 may also be limited in the third rotation direction.

Figure 5:
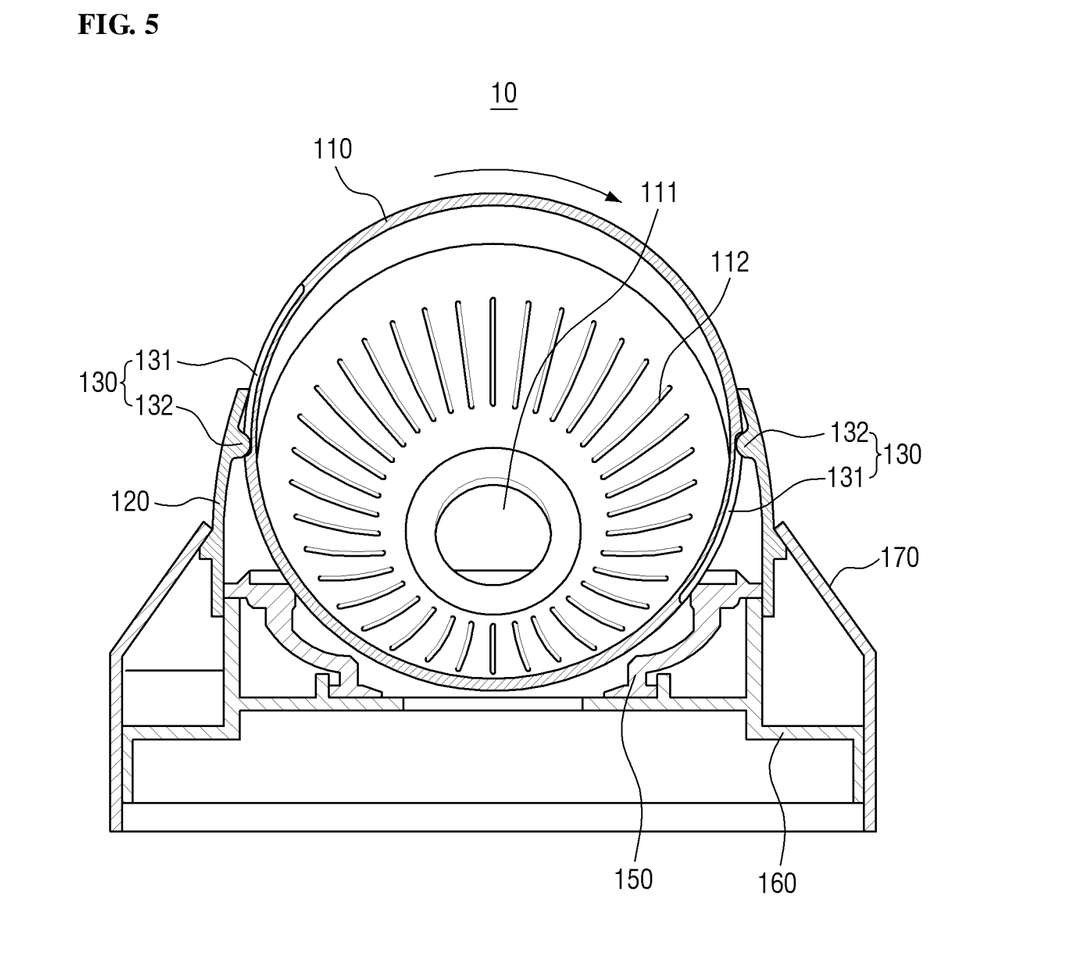
FIG. 5 is a cross-sectional view illustrating a state in which the rotation range of the housing part in a first rotation direction is limited according to an embodiment of the inventive concept.
Figure 6:
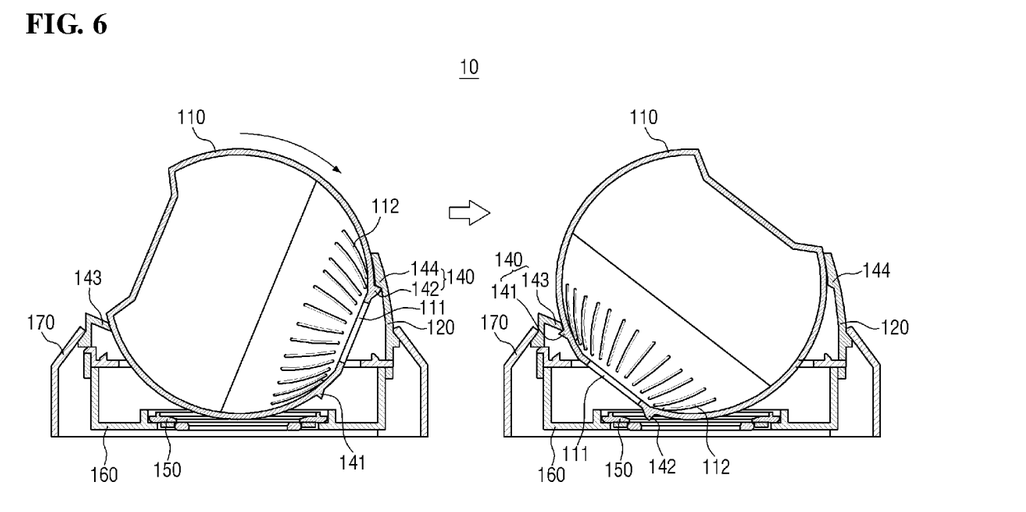
FIG. 6 is a cross-sectional view illustrating a state in which the rotation range of the housing part in a second rotation direction is limited according to an embodiment of the inventive concept.

FIG. 5 is a cross-sectional view illustrating a state in which the rotation range of the housing part in the first rotation direction is limited according to an embodiment of the inventive concept. FIG. 6 is a cross-sectional view illustrating a state in which the rotation range of the housing part in the second rotation direction is limited according to an embodiment of the inventive concept.

Referring to FIG. 5, the housing part 110 may rotate in the first rotation direction when receiving a rotational driving force in the first rotation direction from the rotation driving part 150. However, the rotation range of the housing part 110 in the first rotation direction is limited by the guide slot 131 and the guide protrusion 132 of the first rotation restricting part.

For example, the housing part 110 can be rotated only by a predetermined angle by the guide slot 131 formed on both sides of the housing part 110 and the guide protrusion 132 formed on the connection cover part 120. That is, the rotation range of the housing part 110 in the first rotation direction is limited. Specifically, when the housing part 110 is rotated by a predetermined angle in the first rotation direction, the guide protrusion 132 is caught on an end of the guide slot 131. Accordingly, the housing part 110 can no longer rotate in the first rotation direction.

Referring to FIG. 6, the housing part 110 may rotate in the second rotation direction when receiving a rotational driving force in the second rotation direction from the rotation driving part 150. However, the housing part 110 can be rotated only by a predetermined angle by the stoppers 141 and 142 formed on the rear surface of the housing part 110 and the stopping protrusions 143 and 144 formed on the connection cover part 120. That is, the rotation range of the housing part 110 in the second rotation direction is limited.

For example, when the housing part 110 rotates forward by a predetermined angle in the second rotation direction, the first stopper 141 formed on the housing part 110 may be caught on the first stopping protrusion 143 formed on the connection cover part 120. Accordingly, the housing part 110 can no longer rotate forward in the second rotation direction.

In addition, when the housing part 110 rotates reversely by a predetermined angle in the second rotation direction, the second stopper 142 formed on the housing part 110 may be caught on the second stopping protrusion 144 formed on the connection cover part 120. Accordingly, the housing part 110 can no longer rotate reversely in the second rotation direction.

Figure 7:
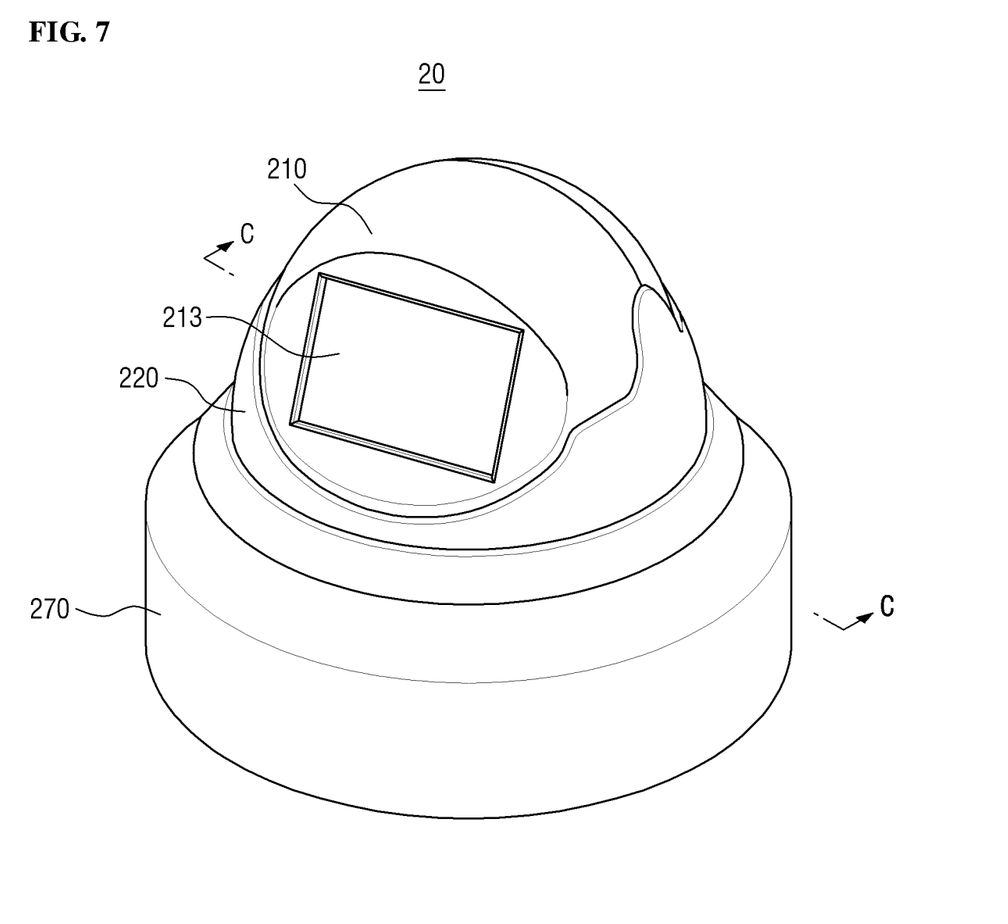
FIG. 7 is a perspective view of a dome camera device according to another embodiment of the inventive concept.
Figure 8:
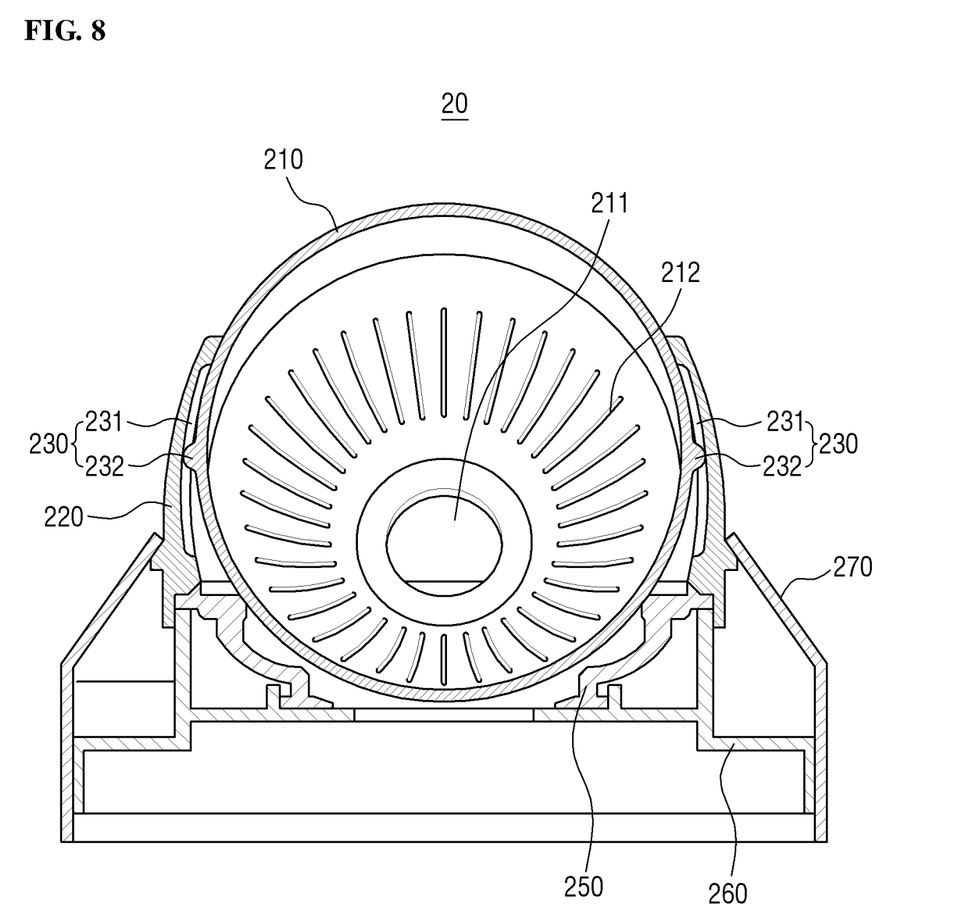
FIG. 8 is a cross-sectional view taken along the line C-C of FIG. 7.

FIG. 7 is a perspective view of a dome camera device according to another embodiment of the inventive concept. FIG. 8 is a cross-sectional view taken along the line C-C of FIG. 7.

In FIGS. 7 and 8, a detailed description of components substantially identical to those described above with reference to FIGS. 1 through 4 will be omitted.

Referring to FIGS. 7 and 8, the dome camera device 20 according to the embodiment of the inventive concept includes a housing part 210, a connection cover part 220, a first rotation restricting part 230, and a second rotation restricting part 240. In addition, the dome camera device 20 may further include a rotation driving part 250, a base frame part 260, and a base cover part 270.

The connection cover part 220 includes an extension portion 221 extending in a first rotation direction on both sides of the connection cover part 220. The extension portion 221 partially covers both sides of the housing part 210.

The first rotation restricting part 230 limits the rotation range of the housing part 21 in the first rotation direction and includes a guide slot 231 and a guide protrusion 231 inserted into the guide slot 231 to be slidably moved.

The guide slot 231 is located on both sides of the connection cover part 220. The guide slot 231 may be formed in an inner surface of the connection cover part 220 along the first rotation direction, and at least part of the guide slot 231 may be formed in the extension portion 221. Here, both sides denote left and right sides.

The guide protrusion 232 is formed on the housing part 210 and is located at a position corresponding to the guide slot 232. For example, the guide protrusion 232 is located on both sides of the housing part 210. In addition, the guide protrusion 232 protrudes from an outer surface of the housing part 210 and is inserted into the guide slot 231. Accordingly, the guide protrusion 232 can limit the rotation range of the housing part 210 in the first rotation direction to the length of the guide slot 231.

Here, the computer-readable recording medium may be achieved in the form of magnetic medium such as a ROM, a floppy disk and hard disk, an optical media such as a CD and a DVD, and a carrier wave such as transmission through Internet.

Further, the computer-readable recording medium is dispersed into computer systems connected through a network, and a code readable by the computer in a distributed manner may be stored in the recording medium.

While the present invention has been particularly illustrated and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

INDUSTRIAL APPLICABILITY

The present inventive concept can prevent twisting of a cable connected to a dome camera device by limiting the rotation range of a housing part in which a camera is accommodated. Therefore, the inventive concept has a sufficient possibility of commercialization and sales and can be clearly implemented in reality. In this regard, the inventive concept is industrially applicable.

The invention claimed is:

1. A camera device comprising:
   a housing part including at least a partially spherical surface;
   a camera located inside the spherical surface of the housing part, wherein the housing part rotates in multiple directions including a first direction and a second, direction;
   a connection cover part located over the housing part to cover at least a portion of a circumference of the housing part; and
   the connection cover part including a first rotation restricting part which limits the rotation of the housing part in the first direction to be in a first rotation range,
   wherein the housing part rotates in the first direction in a slidable manner with respect to the connection cover part, and
   wherein the housing part rotates in the second direction together with the connection cover part.

2. The camera device of claim 1, wherein the first direction comprises one of a roll or left-right rotation direction, and a tilt or vertical rotation direction.

3. The camera device of claim 2, wherein the second direction comprises a pan or horizontal direction.

4. The camera device of claim 3, further comprising:
   a second rotation restricting part configured to limit the rotation of the housing part in the second direction to be in a second rotation range, wherein the first rotation range is defined to be less than the second rotation range.

5. The camera device of claim 4, further comprising:
a base frame part configured to support the connection cover part, wherein the housing part and the connection ver part rotate together in the second direction on the base frame part.

6. The camera device of claim 4, wherein the first rotation restricting part comprises a stopper formed on the connection cover part and a guide structure formed on the spherical surface of the housing part, the stopper being movable in a slidable manner along the guide structure in the first direction.

7. The camera device of claim 6, wherein the guide structure is a guide slot formed in the outermost surface of the housing part, and the guide slot extends along the first direction and is shaped to limit the rotation of the housing part in the first direction to be in the first rotation range.

8. The camera device of claim 6, wherein the stopper comprises stoppers which are spaced apart and protrude from the surface of the housing part, and the guide structure comprises stopping protrusions configured to respectively catch the stoppers such that the housing part does not rotate in the first direction beyond the first rotation range.

9. The camera device of claim 1, wherein housing part is further configured to have a transparent window at a position corresponding to a lens of the camera.

* * * * *